和2,929,779

Patented Mar. 22, 1960

2,929,779

SILICONE OIL GREASE CONTAINING A PHTHALOCYANINE AND ACETYLENE BLACK

Francis F. Sullivan, Oxon Hill, and Hayward R. Baker, Hyattsville, Md., and Curtis R. Singleterry, Arlington, Va., assignors to the United States of America as represented by the Secretary of the Navy No Drawing. Application October 31, 1956
Serial No. 619,643

11 Claims. (Cl. 252—29)

(Granted under Title 35, U.S. Code (1952), sec. 266)

The invention described herein may be manufactured and used by or for the Government of the United States of America for governmental purposes without the payment of any royalties thereon or therefor.

This invention relates to new semi-fluid compositions, more particularly to improved silicone oil greases for high temperature lubrication.

It has heretofore been proposed to employ silicone oil greases for high temperature lubrication in which a metal phthalocyanine is used as the thickener. The usefulness of silicone oils or liquid polysiloxanes as high temperature lubricants is critically limited, however, by their rapid deterioration under service conditions at temperatures in the range of 400 to 500° F. This deterioration of silicone oils we have found to result from two separate processes, both of which may be accelerated by the action of atmospheric oxygen. The one process is volatilization of low molecular weight products of oxidation or oxidative fission of the silicone molecule. The other is further polymerization of the silicone oil in the presence of the oxidation products with ensuing gelation of the oil to eventually a semisolid or gel.

We have found that silicone oil greases having a high degree of chemical stability under service conditions at temperatures in the range of about 400 to 580° F., can be obtained by the addition of small amounts of finely divided acetylene black to silicone oil greases which are thickened with a metal phthalocyanine, e.g., copper or chlorinated copper phthalocyanine.

The action of the acetylene black is to strongly retard gelation of silicone oils at temperatures of 400 to 580° F. even when it is used in amounts as small as 0.1% by weight of the grease composition. Retarding of the gelation is more pronounced when the acetylene black is used in the grease in conjunction with an oxidation inhibitor which is effective at a temperature within the indicated range of high temperatures. Suitable oxidation inhibitors of this kind are those of the arylamine type, for example, phenyl-$\alpha$-naphthylamine, those of the phenothiazine, type, for example, phenothiazine and dilauryl selenide. The oxidation inhibitor may be used in small amounts, for example, from about 0.5 to 5% by weight depending upon the particular oxidation inhibitor employed. While the finely divided acetylene black may be effectively employed over a wide range of proportions to obtain improvement in chemical stability of the grease at temperatures of 400 to 580° F., it is in general advantageous to employ a metal phthalocyanine as the primary thickening agent so as to obtain optimum grease structure and to add only such amounts as may be required to produce the chemical stability sought in the grease. While amounts of the acetylene black equal to about 7% by weight can be usefully employed in the grease compositions, in general, a practical range of proportions therefor in the greases is from about 1 to 4% by weight of the composition. The acetylene black has been found capable of producing a remarkably high degree of chemical stability in the greases at the indicated high temperatures without destroying the good grease structure which is to be obtained by use of a metal phthalocyanine pigment, as thickener, or reducing the shear stability and low bleeding behavior of the grease. An added beneficial effect of the presence of the finely divided acetylene black in the grease is in its capacity to remain in a uniform state of dispersion in the grease whereby as a solid it reinforces the inherent plastic structure of the grease.

Preparation of the greases of the present invention can be carried out in the following manner. The finely divided acetylene black and the liquid polysiloxane or silicone oil are mixed together along with an oiliness additive, for example, phenyl stearic acid and with the oxidation inhibitor, when the same is used. The resulting oil suspension is then heated to degas the acetylene black of adsorbed air, for which it is heated in an oven for about one-half hour at a temperature which is above that at which the grease is to be used in service, for example, at 480° F. for a service temperature of 450° F. Any liquid polysiloxane may be used as the silicone oil for the greases, for example, polymethylsiloxane, polyethylsiloxane, polyphenylmethylsiloxanes of varying degrees of phenylation (aromaticity), and the liquid halogenated arylsiloxanes as described in U.S. Patents 2,599,984 and 2,642,395. The invention is practiced to the greatest advantage with liquid polyphenylmethylsiloxanes which are lightly phenylated, i.e., those having less than about 15% of phenyl groups in the molecule. Such liquid polysiloxanes possess desirable viscosity-temperature values for the greases. The phthalocyanine pigment powder to be used as thickener for the grease is wet with a minimum of the oil suspension to form a paste, milled on a three roll paint mill to a smooth consistency and the prepared silicone oil mixture then added in small amounts at intervals during the milling. Milling is continued until a smooth paste is obtained. The paste is removed from the mill and heated in an oven for an hour at a temperature which is above that at which the grease is to be used in service, for example, at 480° F. for a service temperature of 450° F. The grease is returned to the mill, worked for several passes, heated in the oven as before and again returned to the mill where it is worked a short time to restore the milled condition of the grease. It is then ready for service use or to be packaged. The heat treatment serves to complete the dispersion of the solids in the grease. Suitable proportions of the phthalocyanine powder for producing the grease structure is from about 18 to 25% by weight of the composition.

Illustrative of improved silicone oil greases which can be prepared in accordance with the present invention is the grease of the following composition.

| Component: | Percent weight of composition |
|---|---|
| Chlorinated copper phthalocyanine | 20 |
| Acetylene black [1] | 3 |
| Phenyl-$\alpha$-naphthylamine | 3 |
| Phenylstearic acid | 1 |
| Polyphenylmethylsiloxane [2] | 73 |
| | 100 |

[1] Shawinigan Black, Type CF, of calculated average particle diameter 55.5 mu; oil absorption factor 290; pH 5.1.
[2] DC510. A slightly phenylated polyphenylmethylsiloxane of 50 centistokes at 77° F.

The new greases are useful as lubricants for ball and roller bearings and have the capacity to retain their soft and oily texture at temperatures of from about 400 to 580° F. for substantially longer periods than greases of the corresponding composition which do not contain the acetylene black. A grease of the composition of the above example will remain soft and oily at 480° F. for

What is claimed is:

1. A semi-fluid composition consisting essentially of a major proportion of liquid polysiloxane of lubricating viscosity, a minor proportion of a metal phthalocyanine sufficient to thicken the liquid polysiloxane to grease consistency and from about 0.1 to 7% by weight of finely divided acetylene black sufficient to increase the resistance to gelation of the liquid polysiloxane.

2. A semi-fluid composition consisting essentially of a major proportion of a liquid polysiloxane of lubricating viscosity, a minor proportion of a copper phthalocyanine sufficient to thicken the liquid polysiloxane to grease consistency and from about 1 to 7% by weight of a finely divided acetylene black sufficient to increase the resistance to gelation of the liquid polysiloxane.

3. A semi-fluid composition consisting essentially of a major proportion of a liquid polysiloxane of lubricating viscosity, a minor proportion of a chlorinated copper phthalocyanine sufficient to thicken the liquid polysiloxane to grease consistency and from about 1 to 7% by weight of finely divided acetylene black sufficient to increase the resistance to gelation of the liquid polysiloxane.

4. A semi-fluid composition consisting essentially of a major proportion of a liquid polysiloxane of lubricating viscosity, a minor proportion of a copper phthalocyanine sufficient to thicken the liquid polysiloxane to grease consistency and from about 1 to 4% by weight of a finely divided acetylene black sufficient to increase the resistance to gelation of the liquid polysiloxane.

5. A semi-fluid composition consisting essentially of a major proportion of a liquid polysiloxane of lubricating viscosity, a minor proportion of a metal phthalocyanine sufficient to thicken the liquid polysiloxane to grease consistency, from about 0.1 to 7% by weight of finely divided acetylene black sufficient to increase the resistance to gelation of the liquid polysiloxane and from about 0.5 to 5% by weight of an oxidation inhibitor which is effective at a temperature within the range of from about 400 to 580° F. to further increase the resistance to gelation of the liquid polysiloxane.

6. A semi-fluid composition consisting essentially of a major proportion of a liquid polysiloxane of lubricating viscosity, a minor proportion of a metal phthalocyanine sufficient to thicken the liquid polysiloxane to grease consistency, from about 1 to 7% by weight of a finely divided acetylene black sufficient to increase the resistance to gelation of the liquid polysiloxane and from about 0.5 to 5% by weight of phenyl-$\alpha$-naphthylamine to further increase the resistance to gelation of the liquid polysiloxane.

7. A semi-fluid composition consisting essentially of a major proportion of a liquid polysiloxane of lubricating viscosity, a minor proportion of a metal phthalocyanine sufficient to thicken the liquid polysiloxane to grease consistency, from about 1 to 7% by weight of finely divided acetylene black sufficient to increase the resistance to gelation of the liquid polysiloxane and from about 0.5 to 3% by weight of phenothiazine to further increase the resistance to gelation of the liquid polysiloxane.

8. A semi-fluid composition consisting essentially of a major proportion of a liquid, polyphenylmethylsiloxane of lubricating viscosity and having not more than about 15% phenylation, a minor proportion of a metal phthalocyanine sufficient to thicken the liquid polysiloxane to grease consistency, from about 1 to 7% by weight of finely divided acetylene black sufficient to increase the resistance to gelation of the liquid polysiloxane and from about 0.5 to 5% by weight of an oxidation inhibitor which is effective at a temperature within the range of from about 400 to 580° F. to further increase the resistance to gelation of the liquid polysiloxane.

9. A semi-fluid composition consisting essentially of a major proportion of a liquid, polyphenylmethylsiloxane of lubricating viscosity and having not more than about 15% phenylation, a minor proportion of a copper phthalocyanine sufficient to thicken the liquid polysiloxane to grease consistency, from about 1 to 4% by weight of a finely divided acetylene black sufficient to increase the resistance to gelation of the liquid polysiloxane and from about 0.5 to 5% by weight of an oxidation inhibitor which is effective at a temperature within the range of from about 400 to 580° F. to further increase the resistance to gelation of the liquid polysiloxane.

10. A semi-fluid composition consisting essential of a major proportion of a liquid, polyphenylmethylsiloxane of lubricating viscosity and having not more than about 15% phenylation, a minor proportion of a chlorinated copper phthalocyanine sufficient to thicken the liquid polysiloxane to grease consistency, from about 1 to 4% by weight of finely divided acetylene black sufficient to increase the resistance to gelation of the liquid polysiloxane and from about 0.5 to 5% by weight of an oxidation inhibitor which is effective at a temperature within the range of from about 400 to 580° F. to further increase the resistance to gelation of the liquid polysiloxane.

11. A semi-fluid composition consisting essentially of a major proportion of a liquid, polyphenylmethylsiloxane of lubricating viscosity and having not more than about 15% phenylation containing from 0.5 to 5% by weight of phenyl-$\alpha$-naphthylamine and in which is dispersed from about 18 to 25% by weight of a metal phthalocyanine and from about 1 to 4% by weight of finely divided acetylene black sufficient to increase the resistance to gelation of the liquid polysiloxane.

References Cited in the file of this patent

UNITED STATES PATENTS

| 2,453,153 | Morway et al. | Nov. 9, 1948 |
| 2,486,674 | Pedersen | Nov. 1, 1949 |
| 2,522,460 | Morway et al. | Sept. 12, 1950 |
| 2,597,018 | Merker | May 20, 1952 |

OTHER REFERENCES

Boner: "Lubricating Greases," Reinhold Pub. Co., 1954, pp. 690–97, 700–01.